(12) United States Patent
De Leu

(10) Patent No.: US 6,648,277 B2
(45) Date of Patent: Nov. 18, 2003

(54) ELECTRICAL CONDUIT BOX MOUNTING STRAP

(76) Inventor: Douglas F. De Leu, 15771 Hillside Dr., Vandalia, MI (US) 49095

( * ) Notice: Subject to any disclaimer, the term of this patent is extended or adjusted under 35 U.S.C. 154(b) by 0 days.

(21) Appl. No.: 09/834,895

(22) Filed: Apr. 16, 2001

(65) Prior Publication Data

US 2002/0092953 A1 Jul. 18, 2002

Related U.S. Application Data

(60) Provisional application No. 60/206,241, filed on May 23, 2000.

(51) Int. Cl.⁷ ............................................. F16M 13/02
(52) U.S. Cl. .......................... 248/27.1; 248/906; 174/58
(58) Field of Search ............................. 248/906, 27.1; 174/58

(56) References Cited

U.S. PATENT DOCUMENTS

| | | | |
|---|---|---|---|
| 1,246,107 A | 11/1917 | Kendig | |
| 1,818,814 A | 8/1931 | Riggs et al. | |
| 2,143,278 A * | 1/1939 | Myers | 247/15 |
| 2,514,176 A * | 7/1950 | Borkowski | 248/27 |
| 2,518,515 A * | 8/1950 | Austin | 248/49 |
| 2,605,806 A | 8/1952 | Tinnerman | 151/41.75 |
| 2,681,164 A * | 6/1954 | Kalfen | 220/18 |
| 2,919,879 A * | 1/1960 | Hume | 248/205 |
| 3,115,265 A | 12/1963 | Mulkey et al. | 220/3.5 |
| 3,674,913 A | 7/1972 | Yates | 174/48 |
| 3,759,473 A * | 9/1973 | Sosaya | 248/205 R |
| 3,963,204 A | 6/1976 | Liss | 248/27 R |
| 4,108,414 A * | 8/1978 | Grant, Sr. | 248/300 |
| 4,626,617 A * | 12/1986 | Rye | 174/53 |
| 4,693,438 A | 9/1987 | Angell | 248/27.3 |
| 5,239,132 A * | 8/1993 | Bartow | 174/58 |
| 5,641,940 A | 6/1997 | Whitehead | 174/48 |
| 6,098,939 A * | 8/2000 | He | 248/205.1 |

* cited by examiner

Primary Examiner—Korie Chan
Assistant Examiner—Steven Marsh
(74) Attorney, Agent, or Firm—Richard C. Litman

(57) ABSTRACT

An electrical conduit box mounting strap is described having a single unitary structure. The strap is used for mounting conduit boxes as a fixed rigid composite structure within a volume of an internal void or cavity of a concrete, cement or similar block of material. The strap is shaped and configured to stabilize the conduit box, particularly as conduit wires are pulled therethrough.

4 Claims, 7 Drawing Sheets

ELECTRICAL CONDUIT BOX MOUNTING STRAP

CROSS-REFERENCE TO RELATED APPLICATION

This application claims the benefit of U.S. Provisional Patent Application Serial No. 60/206,241, filed May 23, 2000.

BACKGROUND OF THE INVENTION

1. Field of the Invention

The present invention relates generally to electric conduit box mountings and, more specifically to a mounting strap for retaining an electric conduit box within a retaining wall or cavity.

2. Description of Related Art

A variety of mounting devices have been devised for permanently and temporarily securing outlet boxes within the interior of a wall or cavity as a combination attachment. Many of the conventional electrical fixtures such as outlet boxes and the like require a number mechanical fasteners for mounting. Typically, when an outlet box is mounted to a wall, there is no remote need for having the box secured thereto, other than locally attaching a face plate for aesthetic appeal or residual wiring.

Although mechanical fasteners have proven effective for mounting electrical fixtures involving sheet rock or wall structures (i.e. non-conducting materials) having wood as interior support beams, etc., the installation of conduit boxes with cement or concrete casting become nearly impossible with conventional techniques. This effectiveness of the conventional techniques primarily rest with the workable qualities of wood, sheet rock or similar material. These materials unlike the physical properties of cement, concrete and the like are not brittle and are easy to cut and repair. While there is a tendency for mechanical fasteners to become unattached or unthreaded within these particular materials, as a result of wall repairs, replacements, etc. mechanical fasteners or threaded fasteners are typically easy to replace after material refillings, replacement of studs, or locating another place within the wall for securing the fastener accordingly.

This is not the case for concrete structures or the like which house electrical conduit boxes. Several difficulties arise which require new or unconventional methods to resolve. First of all, mechanical fasteners for concrete or similar material have a tendency to destroy the integrity of the building structure. These materials simply do not lend themselves to replacements as recited above. Secondly, electrical conduit boxes require not only secure attachment for local wiring or common electrical finishing, but require secure attachment for remote conveying of wires through conduits from level to level of various residential and industrial building interiors. In this regard, a need exists wherein electrical conduit boxes can be retained without the use of conventional techniques or mechanical fasteners as described herein. An electrical conduit box mounting strap which mounts conduit boxes without the use of mechanical fasteners as recited above are lacking.

For example, U.S. Pat. No. 1,246,107 issued to Kendig discloses a support for electrical fixtures comprising a frame provided with laterally extended flanges adapted to engage the front face of a wall and having supporting members on the side of the frame for engaging the wall behind the front face by insertion. These type of supports are considered conventional fixtures used for retaining power socket conduits or the like within an interior portion of a wall.

U.S. Pat. No. 3,115,265 issued to Mulkey et al. discloses an electrical outlet box having an expandable protector. The protector is a substantially rectangular three-piece insertable band for mounting the outlet box within a wall. The band includes two pairs of connected corner pieces which interconnect around the box as male and female interconnected pieces.

U.S. Pat. No. 2,605,806 issued to Tinnerman discloses a fastening device which accommodates the use of conventional mechanical fasteners such as nuts, bolts, screws, rivets and similar studs as a spring loaded fastening device. The device comprises a spring actuated hook-type attachment means which is designed for clip or snap fastening of a bolt or nut to prevent the accidental removal or displacement while turning or otherwise threading the respective element within an a complimentary threaded aperture.

U.S. Pat. No. 1,818,814 issued to G. R. Riggs et al. discloses an electrical outlet box support comprising a substantially C-shaped construction. Two sets of dual retaining apertures for mechanical fasteners are disposed on front top and bottom portions of the C-shaped support for attaching the support in combination with an outlet box to a wall.

U.S. Pat. No. 3,674,913 issued to Yates discloses a temporary support for an electrical outlet box comprising a transverse member which extends across an outer portion of a outlet box. The transverse bar member is spring loaded for attachment with an end of the outlet box for temporary mounting. Detachably connected to the transverse member is a support bracket having a general U-shape. The base of the U-shaped support is reduced in size for receiving loop-like ends from the tension springs for connections therewith in opposite directions.

U.S. Pat. No. 3,963,204 issued to Liss discloses an outlet box holder comprising a generally U-shaped strap member which is adapted to be inserted into an opening formed in a wall member. The strap member includes a base portion and a pair of legs which depend therefrom. Each leg has an outward directed extension end formed orthogonal thereto for attachment with a respective retainer. A retainer is adjustably and slidably mounted on each of the legs and has a first portion adapted to engage the inner surface of the wall member. Each of the retainers also has a second portion which is adapted to extend through the opening. The outlet box is inserted into the opening and is received between the retainers. The box holder is a distinctive three-piece outlet box retainer.

U.S. Pat. No. 4,693,438 issued to Angell discloses an electrical box retainer made of thin sheet metal. The retainer has a folded and flattened work hardened nose, a two layer leading protrusion, a divergent barb, an elongated shank and a multiple outward flange having a grasping catch for receiving an insertion tool. At least two retainers are needed to adequately secure an outlet-box within the interior of a wall.

U.S. Pat. No. 5,641,940 issued to Whitehead discloses a poke-through electrical connection assembly retainer which includes an elongate generally tubular housing member and at least one retaining clip for securing the connector in an interfloor passage. The retaining clip includes a transverse flexure portion and at least one anchor point dimensioned and angled from the flexure portion for substantially radially-directed engagement with the wall of the interfloor passage.

None of the above inventions and patents, taken either singly or in combination, is seen to describe the instant invention as claimed.

SUMMARY OF THE INVENTION

The electrical conduit box mounting strap according to the invention is a single unitary structure for mounting conduit boxes as a fixed rigid composite structure within the volume of an internal void or cavity of concrete, cement or similar block material. The mounting strap provides a rigid and stable electrical fixture for conveying electrical wire through conduit. The strap is shaped to form a number of different attachment ends for securing an outlet box within a number of different materials.

Accordingly, it is a principal object of the invention to provide an electrical conduit box mounting strap which retains conduit boxes within concrete, cement or similar wall structures as a stationary conduit box for conveying wiring or the like therethrough.

It is another object of the invention to provide an electrical conduit box mounting strap which attaches to and/or secures conduit boxes without the use of mechanical fasteners.

It is a further object of the invention to provide an electrical conduit box mounting strap which is flexible and structurally rigid as a conduit box retainer.

Still another object of the invention is to provide an electrical conduit box mounting strap as a single unitary retaining structure.

It is an object of the invention to provide improved elements and arrangements thereof in the electrical conduit box mounting strap for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is an electrical conduit box mounting strap for mounting conduit boxes within various material structures. The preferred embodiments of the present invention are depicted in FIGS. 2–7, and are generally referenced by numerals 8, 9, 10 and 11 respectively.

Figure 1:
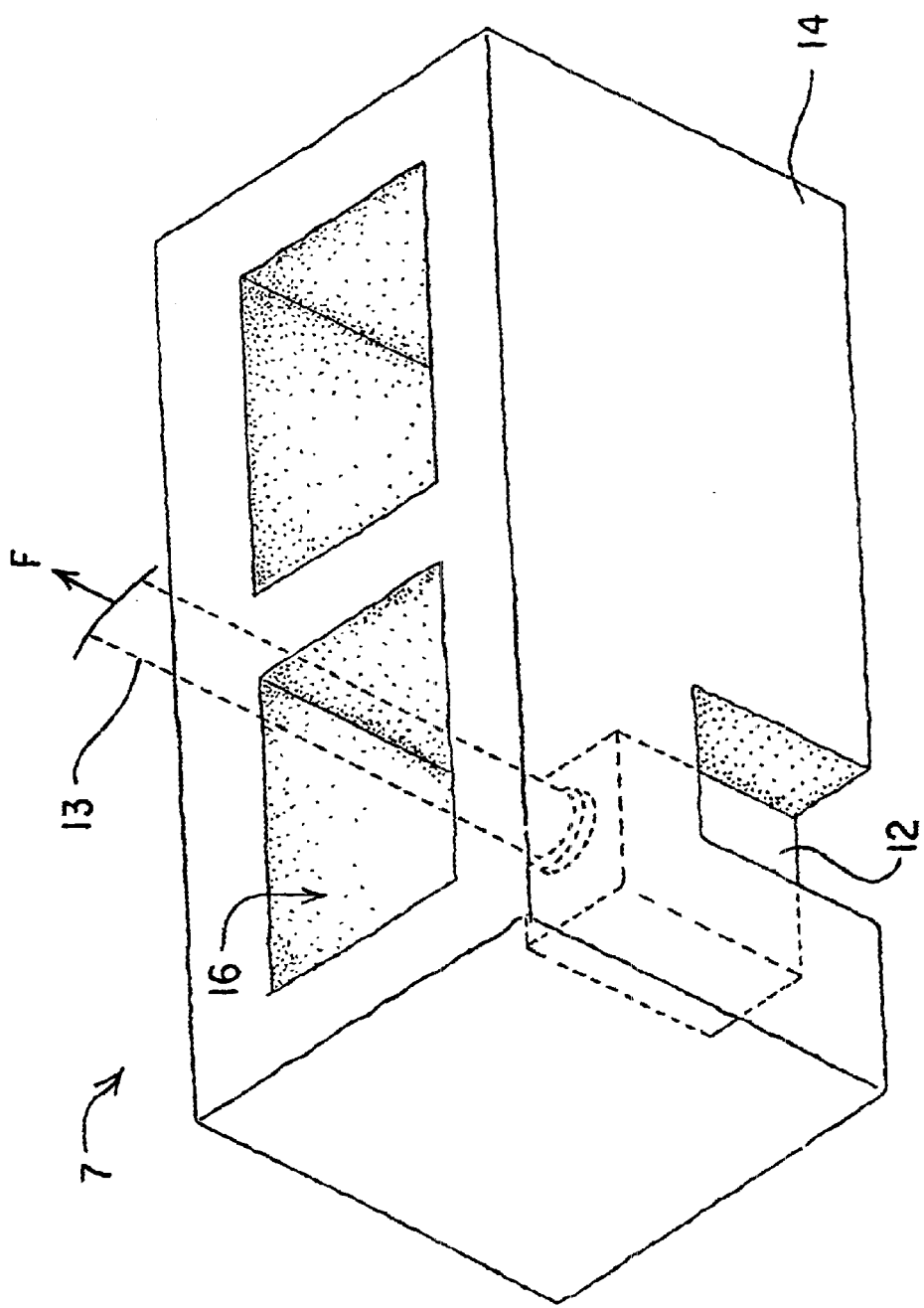
FIG. 1 is an environmental, perspective view of a conventional electrical conduit box mounted within a concrete block.

As diagrammatically illustrated in FIG. 1, there is shown a conventional electrical conduit box assembly 7 comprising a conduit box 12 disposed within a cement, concrete or similar block material 14 having at least one interior cavity 16. This particular arrangement is shown without a retainer which allows the electrical conduit box 12 to move within the cavity 16 when electrical cables or the like (not shown) are pulled through the conduit 13 to be conveyed to another physical layer of a building or similar structure for electrical power output. The pulling force F typically required for electrical cable conveyance or the like usually causes the unrestrained conduit box 12 to bang or dangle within the cavity 16 thereby causing unwanted damage to the conduit 13 or the box 12.

Figure 2:
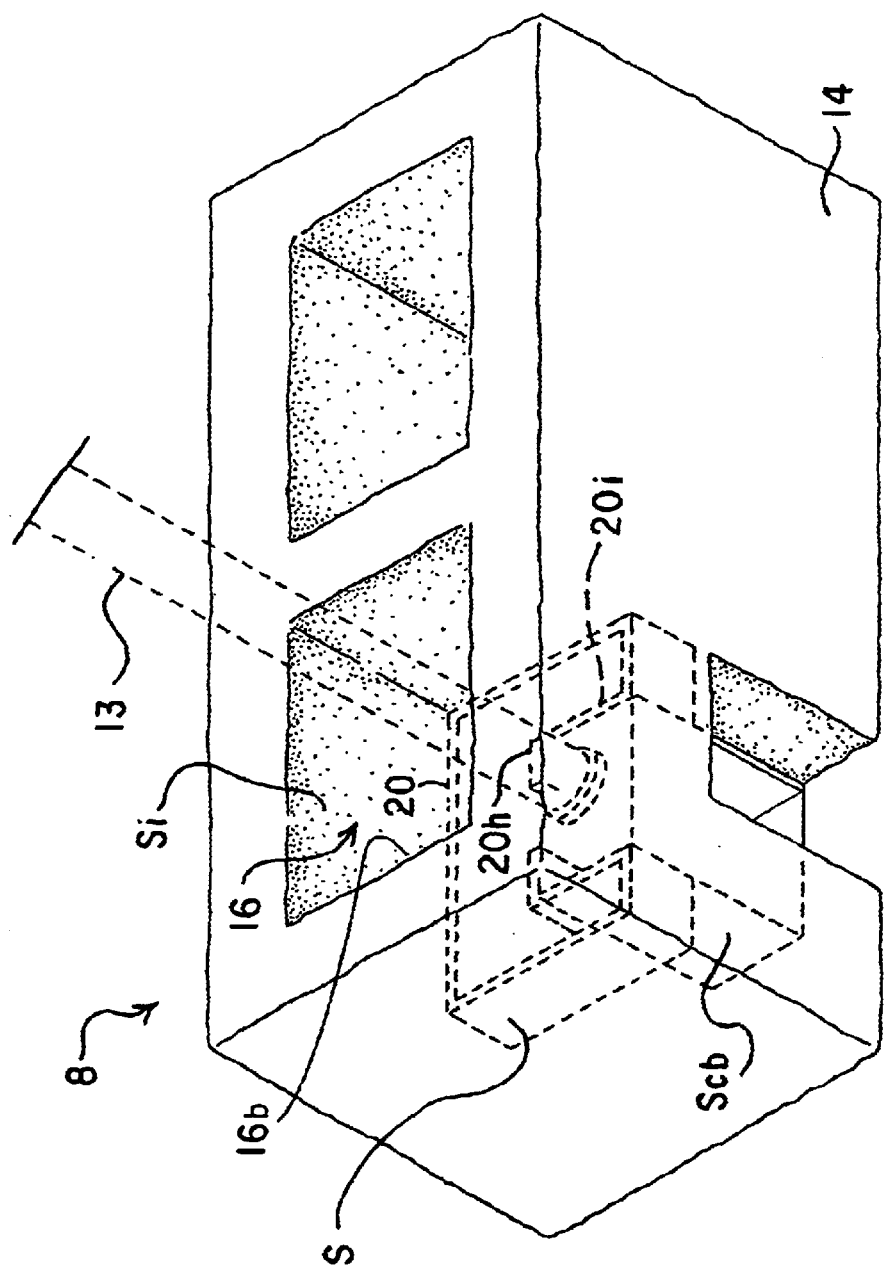
FIG. 2 is an environmental perspective view of the electrical conduit box and strap according to the present invention.
Figure 3:
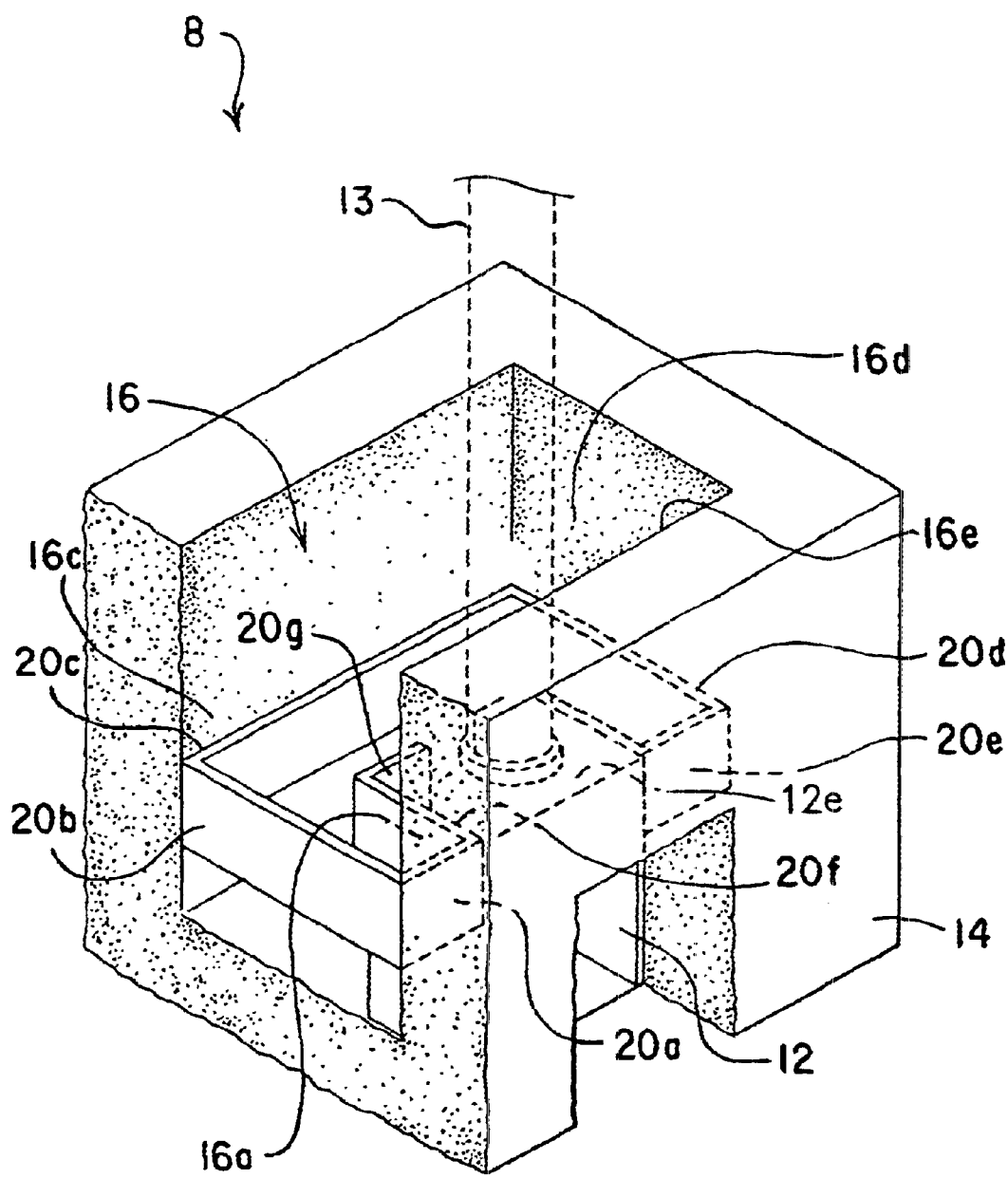
FIG. 3 is a perspective view similar to FIG. 2, the concrete block being broken away to reveal interior detail.

As best seen in FIGS. 2 and 3, the electrical conduit box and mounting strap assembly 8 according to the preferred embodiment of the present invention comprises a strap 20 having a substantially rectangular configuration for mating and abutting attachment with at least one interior cavity 16 formed within a cement, concrete or similar block of material 14. The attachment of the strap 20 within the cavity is retained by friction between at least one surface S of the strap 20 and at least one interior surface $S_i$ of a cavity 16 formed within a respective material 14. This particular method of attachment also includes wherein the strap 20 is made contiguous with at least one surface $S_{cb}$ of the conduit box or similar box material 12. As in the conventional conduit box assembly 7, the conduit box 12 has at least one conduit 13 attached thereto for conveying electrical wires or the like therethrough.

According to the preferred embodiment, the strap 20 comprises a first 20a, second 20b, third 20c, fourth 20d and fifth 20e surface S for respective attachment with a distinct first 16a second 16b, third 16c, fourth 16d, and fifth 16e interior surface $S_i$ of the cavity 16. Depending on the specific electrical needs, the number of conduit boxes 12 installed within a single block of material 14 can vary as a matter of design choice by one having ordinary skill in the art. Notwithstanding, the strap 20 is mounted within the cavity 16 having at least one surface S of the strap 20 attached or mounted contiguous with at least one surface $S_{cb}$ of a conduit box 12. The conduit box 12 comprises first, second, and third mating surfaces for attachment with corresponding sixth 20f, seventh 20g, eighth 20h and ninth 20i surfaces S of the strap 20.

The conduit 13 of the conduit box 12 is preferably centrally disposed on a top surface 12e of the conduit box 12 and is substantially cylindrical. FIG. 3 illustrates the abutting and mating attachment of the strap 20 with both the interior walls of the cavity 16 and the respective surfaces of the conduit box 12 made contiguous therewith.

Figure 4:
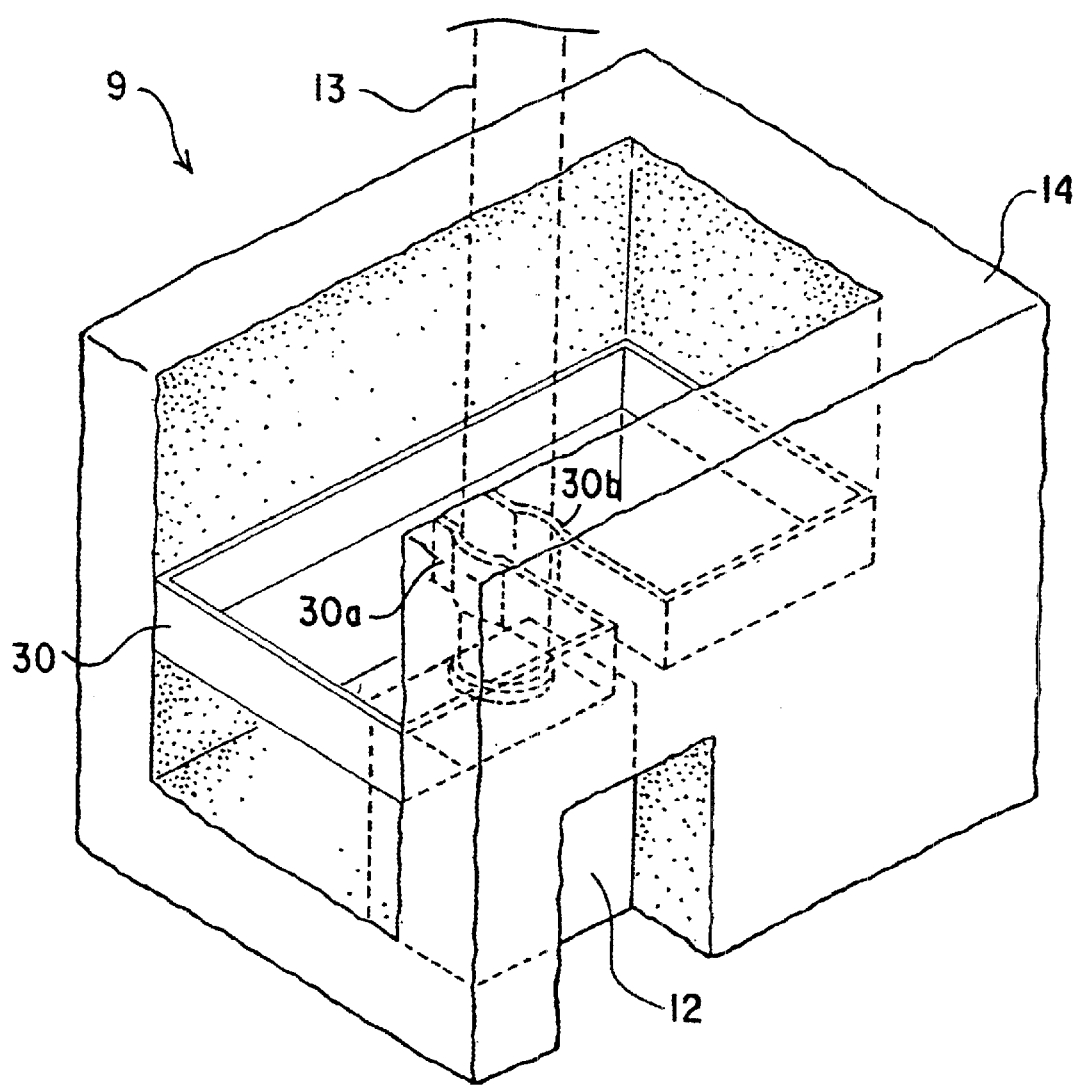
FIG. 4 is a perspective view similar to FIG. 3 of the electrical conduit box and strap according to a second embodiment.
Figure 5:
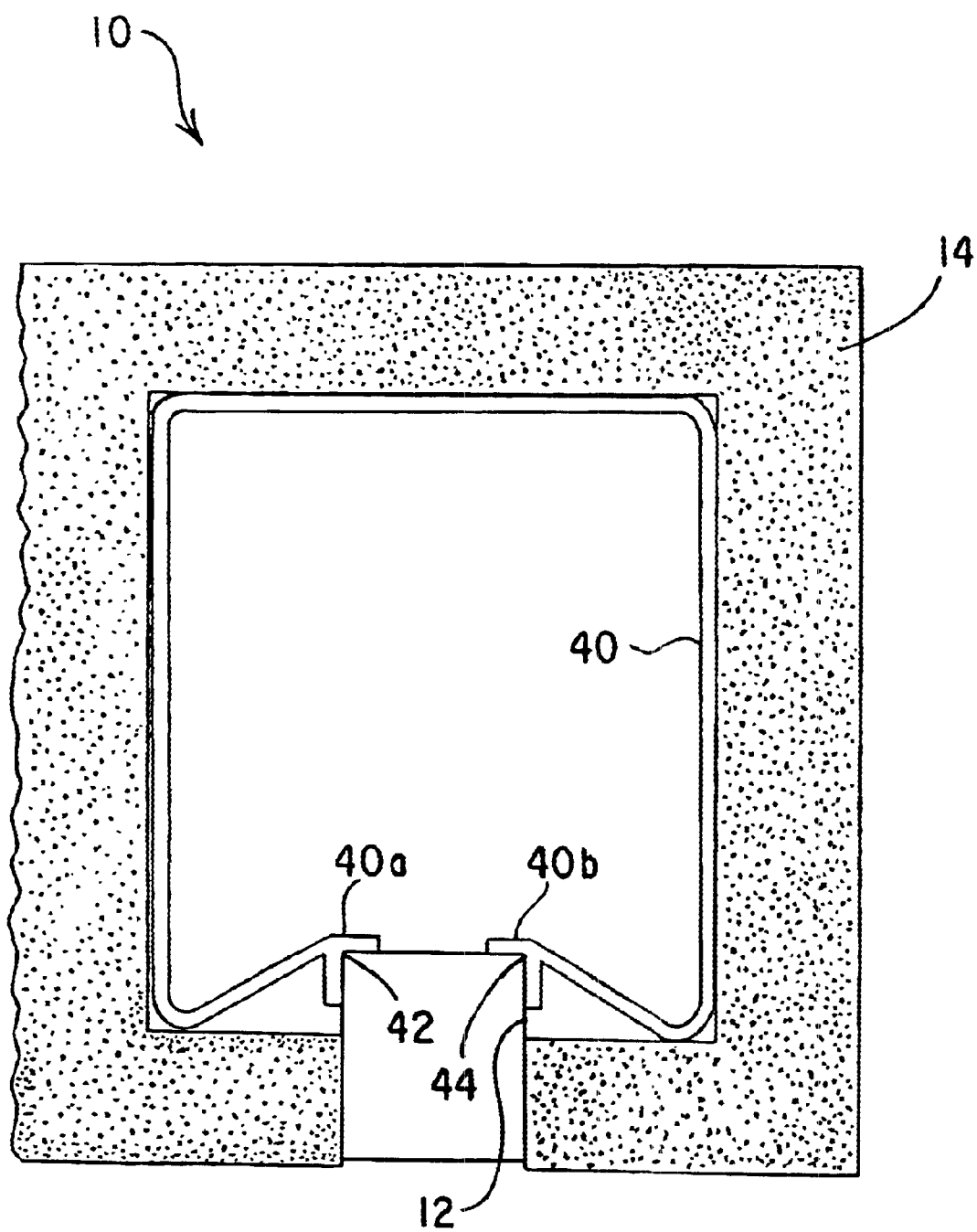
FIG. 5 is a top view of the electrical conduit box and strap according to a third embodiment.
Figure 6:
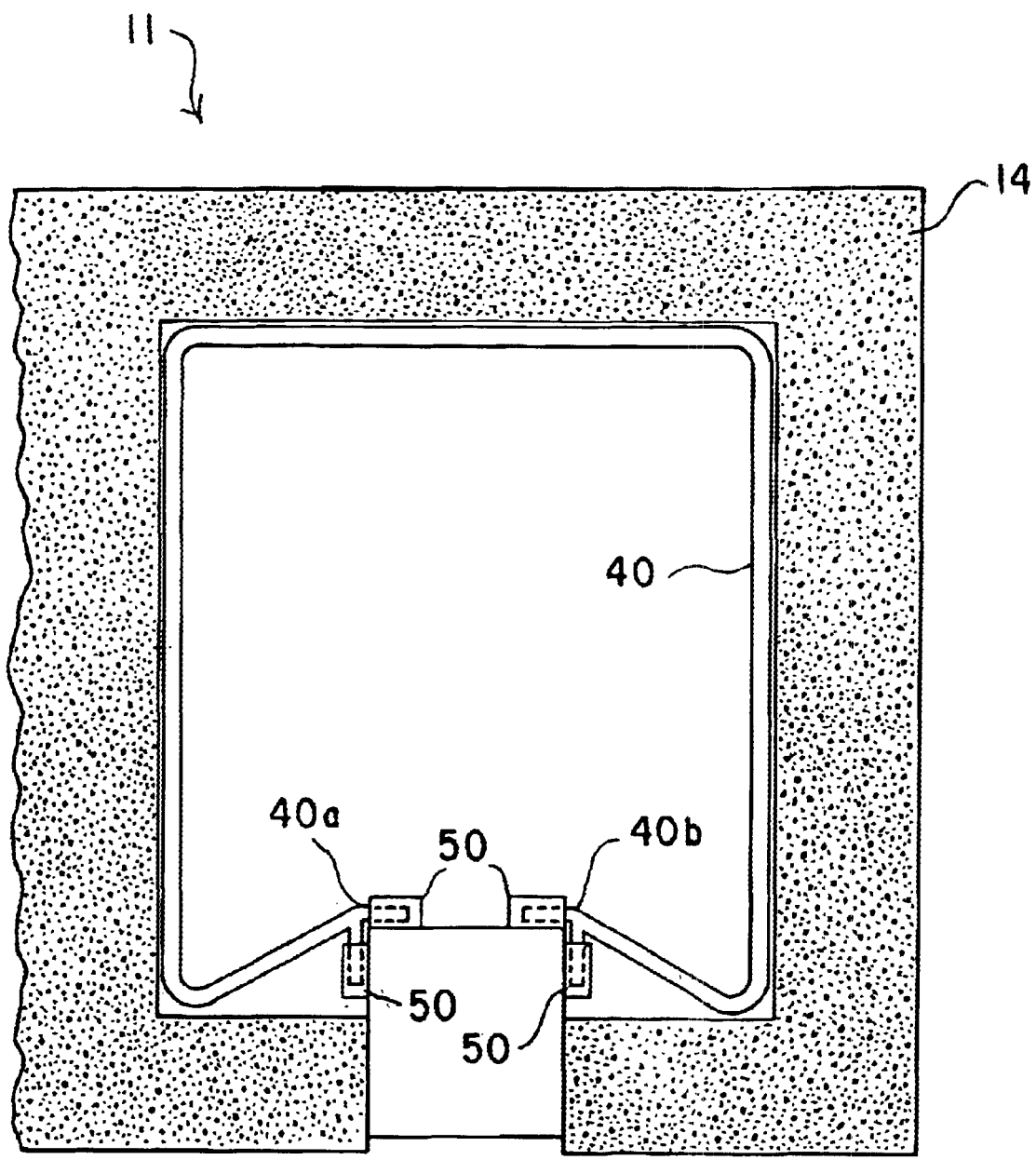
FIG. 6 is a top view of the electrical conduit box and strap according to a fourth embodiment.
Figure 7:
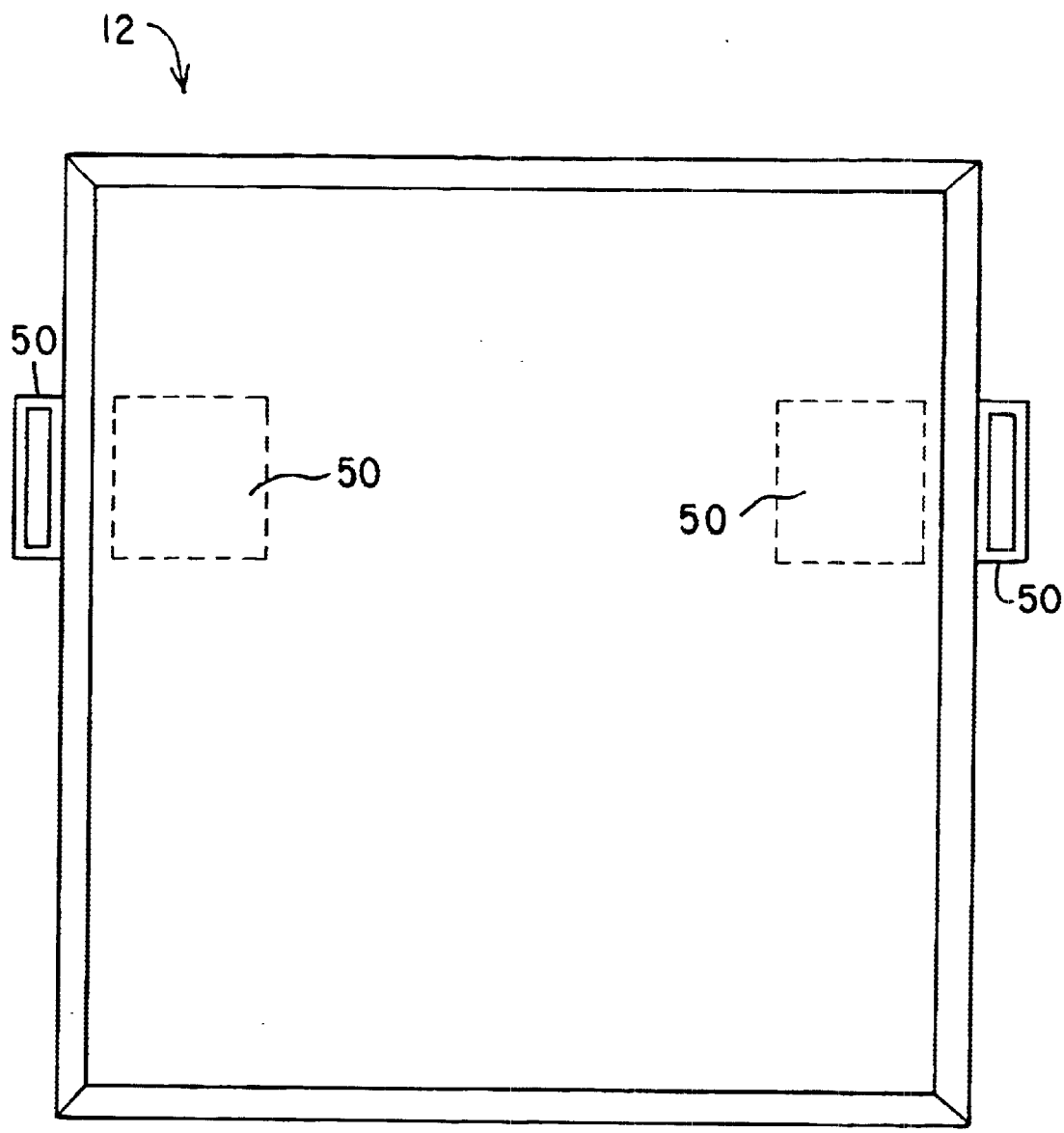
FIG. 7 is front view of the electrical conduit box according to the fourth embodiment, illustrating side and rear insertable slots for inserting the strap as a conduit box retainer.

Other variations of the electrical conduit box mounting strap assembly 8, are diagrammatically illustrated in FIGS. 4–6 according to embodiments 9, 10 and 11, respectively. As illustrated in FIG. 4 according to a second embodiment, the mounting strap 30 has similar abutting and mating surface attachments within the cavity 16 as previously recited above, except that the strap 30 is made to mount the conduit box 12 via contiguous attachment with a surface portion of the substantially cylindrical conduit 13. The strap 30 includes respective first and second conduit abutting surfaces 30a, 30b which are shaped to the contour of the conduit 13.

As diagrammatically illustrated in FIG. 5 according to a third embodiment, the strap 40 is configured with respective first and second orthogonal recessed planar ends 40a and 40b for mating and abutting attachment with a respective first and second protruding orthogonal planar surface corner 42 and 44 of the conduit box 12. This particular arrangement provides alternative fixed security within an interior cavity 16 of the block of material 14 as similarly recited above.

For additional structural reinforcement according to the third embodiment, FIG. 6 schematically illustrates that the box 12 further comprises at least one insertable slot 50 permanently fixed thereto for insertable attachment of the respective first and second orthogonal recessed planar ends 40a, 40b of the strap 40. Each slot 50 is more clearly shown and identified in FIG. 7 from a front view of the electrical conduit box 12.

Other advantages of the strap according to the invention includes making the respective straps 20, 30 and 40 out of a flexible yet structurally rigid metallic or composite material.

It is to be understood that the present invention is not limited to the embodiments described above, but encompasses any and all embodiments within the scope of the following claims.

I claim:

1. An electrical conduit mounting strap for mounting a conduit box within a rectangular cavity defined by a concrete block having four walls including a front wall with a rectangular opening for providing access to the conduit box defined therein, the mounting strap comprising:

a strap having a concrete block attachment portion and a conduit box attachment portion;

said concrete block attachment portion defining a substantially rectangular loop and having first, second, third, fourth, and fifth segments adapted for attachment in the cavity to surfaces defined by the four walls, the fourth and fifth segments being adapted for attachment to two surfaces defined by the front wall on opposite sides of the rectangular opening and defining a conduit box opening in the loop;

said conduit box attachment portion having first and second conduit box retainers, said first and second retainers each comprising:

a sixth segment and a seventh segment continuous with and orthogonal to the fourth and fifth segments, respectively, and extending towards the interior of said loop, the sixth and seventh segments being adapted for attachment to an exterior surface of opposing sidewalls of the conduit box; and an eighth segment and a ninth segment continuous with and orthogonal to the sixth and seventh segments, respectively, the eighth and ninth segments extending towards each other, the eighth and ninth segments being adapted for attachment to an exterior surface of a rear wall of the conduit box;

wherein said concrete block attachment portion is adapted for attachment to the four walls defining the cavity solely by frictional engagement between the strap and the cavity defined by the concrete block; and wherein said conduit box attachment portion is adapted for attachment to the conduit box solely by frictional engagement with the exterior of the conduit box.

2. An electrical conduit mounting strap for mounting a conduit box within a rectangular cavity defined by a concrete block having four walls including a front wall with a rectangular opening for providing access to the conduit box defined therein, the mounting strap comprising:

a strap having a concrete block attachment portion and a conduit box attachment portion;

said concrete block attachment portion defining a substantially rectangular loop and having first, second, third, fourth, and fifth segments adapted for attachment in the cavity to surfaces defined by the four walls, the fourth and fifth segments being angled towards the interior of said loop and defining a conduit box opening in the loop;

said conduit box attachment portion having first and second conduit box retainers, said first and second retainers each comprising:

first and second orthogonal planar ends continuous with and defined at ends of the fourth and fifth segments, respectively, and the first and second orthogonal planar ends being adapted for attachment to rear corners of the conduit box; and wherein said concrete block attachment portion is adapted for attachment to the four walls defining the cavity solely by frictional engagement between the strap and the cavity defined by the concrete block; and wherein said conduit box attachment portion is adapted for attachment to the conduit box by frictional engagement with the exterior of the conduit box.

3. The electrical conduit mounting strap according to claim 2, further comprising a conduit box having a rear wall and having a top wall, a bottom wall, and two opposing sidewalls extending from the rear wall and defining a box adapted for receiving conduit, the conduit box having two orthogonally disposed pairs of slots extending from the opposing sidewalls and rear wall respectively, said first and second orthogonal planar ends being slidably disposed in the two pairs of slots in order to attach said conduit box attachment portion to the conduit box.

4. An electrical conduit mounting strap for mounting an electrical conduit within a rectangular cavity defined by a concrete block having four walls, the mounting strap comprising:

a strap having a concrete block attachment portion and an electrical conduit attachment portion;

said concrete block attachment portion defining a substantially rectangular loop and having first, second, third, fourth, and fifth segments adapted for attachment in the cavity to surfaces defined by the four walls, the fourth and fifth segments being adapted for attachment to a single surface defined by one of the four walls and defining a gap in the loop;

said electrical conduit attachment portion having first and second electrical conduit retainers, said first and second retainers each comprising:

a sixth segment and a seventh segment continuous with and orthogonal to the fourth and fifth segments, respectively, and extending towards the interior of said loop, the sixth and seventh segments having an arcuate portion adapted for attachment to opposing sidewalls of a cylindrical electrical conduit;

wherein said concrete block attachment portion is adapted for attachment to the four walls defining the cavity solely by frictional engagement between the strap and the cavity defined by the concrete block; and wherein said electrical conduit attachment portion is adapted for attachment to the electrical conduit solely by frictional engagement with the electrical conduit.

* * * * *